(12) United States Patent
Yoshida et al.

(10) Patent No.: US 7,321,363 B2
(45) Date of Patent: Jan. 22, 2008

(54) IMAGE DISPLAY DEVICE, IMAGE DATA CONTROL PROGRAM AND IMAGE DATA CONTROL METHOD

(75) Inventors: Yuichi Yoshida, Hachioji (JP); Shinzo Matsui, Kitatsuru-gun (JP)

(73) Assignee: Olympus Corporation, Tokyo (JP)

( * ) Notice: Subject to any disclaimer, the term of this patent is extended or adjusted under 35 U.S.C. 154(b) by 704 days.

(21) Appl. No.: 10/775,866

(22) Filed: Feb. 9, 2004

(65) Prior Publication Data
US 2004/0164977 A1 Aug. 26, 2004

(30) Foreign Application Priority Data
Feb. 25, 2003 (JP) ............................. 2003-048052

(51) Int. Cl.
G06F 3/038 (2006.01)
G09G 5/00 (2006.01)

(52) U.S. Cl. ........................................ 345/204; 345/2.2

(58) Field of Classification Search ................ 345/1.1, 345/2.2, 204, 418
See application file for complete search history.

(56) References Cited

U.S. PATENT DOCUMENTS

| 6,580,458 | B2 * | 6/2003 | Inagaki | 348/333.02 |
| 7,068,818 | B2 * | 6/2006 | Nishio et al. | 382/112 |
| 2002/0122068 | A1 * | 9/2002 | Tsuruoka | 345/810 |
| 2004/0143684 | A1 * | 7/2004 | Cheng | 710/1 |

FOREIGN PATENT DOCUMENTS

| JP | 01273062 | 10/1989 |
| JP | 11167375 | 6/1999 |
| JP | 2002189548 | 7/2002 |

* cited by examiner

*Primary Examiner*—Ricardo Osorio
(74) *Attorney, Agent, or Firm*—Volpe & Koenig PC

(57) ABSTRACT

In an image display device adapted to display an image to viewers, the CPU detects the operating state of given application software and causes the display control unit to control whether to permit the first display unit to display the image or not in accordance with the detected operating state of the application software.

22 Claims, 11 Drawing Sheets

FIG. 13

| NUMBER | |
|---|---|
| USER ID | PERMISSION FLAG |
| ⋮ | ⋮ |
| USER ID | PERMISSION FLAG |

NUMBER
PERMISSION FLAG
BIT 0:ON ···
 PUBLIC DISPLAY
 PERMISSION
BIT 1:ON ···
 ENTIRE-SCREEN
 -BASED
 PUBLIC DISPLAY
 PERMISSION

FIG. 14

| NUMBER | |
|---|---|
| APPLICATION NAME | PERMISSION FLAG |
| ⋮ | ⋮ |
| APPLICATION NAME | PERMISSION FLAG |

NUMBER

FIG. 15

| NUMBER | |
|---|---|
| FILE NAME | PERMISSION FLAG |
| ⋮ | ⋮ |
| FILE NAME | PERMISSION FLAG |

NUMBER

```
┌─────────────────────────────────────────────────────┐
│  ┌──────────┐                                       │
│  │ F FILE   │                                       │
│  ├──────────┴──────────────────────────────────┐    │
│  │ User ID:            TARO YAMADA             │    │
│  │ ACCESS PERMISSION: PERMISSION  ENTIRE-SCREEN REJECTION │
│  │                                DISPLAY      │    │
│  │                                PERMISSION   │    │
│  │ PUBLIC DISPLAY         ×                    │    │
│  │                                             │    │
│  │ CHANGE                 ×                    │    │
│  │ EXECUTE                ×                    │    │
│  │ WRITE                  ×                    │    │
│  │ READ                   ×                    │    │
│  │   ⋮                                         │    │
│  └─────────────────────────────────────────────┘    │
│                                              ╲115A  │
└─────────────────────────────────────────────────────┘
```

FIG. 21

```
┌─────────────────────────────────────────────────────┐
│  ┌──────────┐                                       │
│  │ ABC      │                                       │
│  ├──────────┴──────────────────────────────────┐    │
│  │ User ID:            TARO YAMADA             │    │
│  │ ACCESS PERMISSION: PERMISSION  ENTIRE-SCREEN REJECTION │
│  │                                DISPLAY      │    │
│  │                                PERMISSION   │    │
│  │ PUBLIC DISPLAY                      ×       │    │
│  │                                             │    │
│  │ CHANGE                 ×                    │    │
│  │ EXECUTE                ×                    │    │
│  │ WRITE                  ×                    │    │
│  │ READ  ⋮                ×                    │    │
│  │   ⋮                                         │    │
│  └─────────────────────────────────────────────┘    │
│                                              ╲115A  │
└─────────────────────────────────────────────────────┘
```

FIG. 22

IMAGE DISPLAY DEVICE, IMAGE DATA CONTROL PROGRAM AND IMAGE DATA CONTROL METHOD

CROSS-REFERENCE TO RELATED APPLICATIONS

This application is based upon and claims the benefit of priority from the prior Japanese Patent Application No. 2003-48052, filed Feb. 25, 2003, the entire contents of which are incorporated herein by reference.

BACKGROUND OF THE INVENTION

1. Field of the Invention

The present invention relates to an image display device that presents image information simultaneously to a plurality of people at conferences, presentations, exhibitions, etc., and to a program and method that controls image data to be output to an external display device connected to a computer.

2. Description of the Related Art

Projectors, large-screen display devices and so on have been utilized for allowing a plurality of people to share video information at the same time at small meetings, small and large conferences, seminars, etc. In particular, projectors are able to be carried, allowing all the participants to see the same material and recognize its contents at the same time. Therefore, the projectors are useful in implementing efficient conferences and meetings or persuasive presentations.

Conventional projectors are not so light as to be carried with ease. Thus, they can only be moved from a room to another in the same building and have poor portability. However, electronic devices have recently been reduced in size and weight owing to advances in integrated-circuit technology. For this reason, projectors are also being realized which are so compact as to be carried with ease.

With increase in portability, a scene in which a projector is taken out with ease and utilized for business talks or presentations is also spreading. Projection display by a projector has made it possible to make presentations smartly without causing people to see the display screen of a notebook personal computer in unnatural posture.

A technique related to projectors is to make LED light sources practicable. The LED light sources increase the compactness and portability of the projectors and are fast in lighting and stabilization, allowing the setup time to be reduced.

Incorporating a function of reading a memory card into a projector and storing necessary data into the memory card has eliminated the necessity of carrying a notebook personal computer along with the projector.

Recently, the network function is being incorporated into projectors as well. A projector having the wireless or wire LAN function can capture necessary data from a server or personal computer over the network for making presentations. In addition, hot spots (registered trade mark) have spread over conference rooms of hotels, airports, fast-food restaurants, etc., making the network function easier to use.

Thus, as the portability and maneuverability of projectors increases, an opportunity of performing various setting operations in other places has been increasing. The setting operations include basic setting of brightness, contrast, and so on, confirmation and selection of data to be presented, and downloading data from a server or personal computer into a projector.

At this point, it is the normal practice to select an object file by displaying a list of files from the computer or remote server in the form of a directory and confirm data contents.

In such projectors, techniques to automatically turn a single display device ON or OFF are also known (for example, see Jpn. Pat. Appln. KOKAI Nos. 1-273062, 11-167375 and 2002-189548).

BRIEF SUMMARY OF THE INVENTION

According to a first aspect of the present invention, there is provided an image display device for displaying an image to viewers. The image display device comprises: an application state detecting unit configured to detect the operating state of predetermined application software; a first display unit configured to display the image; and a control unit configured to control whether to operate the first display unit or not in accordance with the operating state detected by the application state detecting unit.

According to a second aspect of the present invention, there is provided a program which controls image data to be output to an external display device connected to a computer. The program causes the computer to perform the following functions: an application state detecting function of detecting the operating state of application software running on the computer; and a display control function of controlling the image data to be output to the external display device according to the operating state detected by the application state detecting function.

According to a third aspect of the present invention, there is provided a method which controls image data to be output to an external display device connected to a computer. The method comprises: detecting the operating state of application software running on the computer; and controlling the image data to be output to the external display device according to the detected operating state.

According to a fourth aspect of the present invention, there is provided an image display device for displaying an image to viewers. The image display device comprises: application state detecting means for detecting the operating state of predetermined application software; first display means for displaying the image; and control means for controlling whether to operate the first display means or not in accordance with the operating state detected by the application state detecting means.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF DRAWING

The accompanying drawings, which are incorporated in and constitute a part of the specification, illustrate embodiments of the invention, and together with the general description given above and the detailed description of the embodiments given below, serve to explain the principles of the invention.

FIG. 13 shows a display control table according to users as a display unit setting table in an image display device according to a second embodiment of the present invention;

FIG. 14 shows a display control table according to applications as a display unit setting table in the image display device according to the second embodiment;

FIG. 15 shows a display control table according to files as a display unit setting table in the image display device according to the second embodiment;

FIG. 21 shows a setting screen when a file is specified on the select screen of FIG. 18;

FIG. 22 shows a setting screen when a directory is specified on the select screen of FIG. 18;

DETAILED DESCRIPTION OF THE INVENTION

The preferred embodiments of the present invention will be described hereinafter with reference to the accompanying drawings.

First Embodiment

Figure 1:
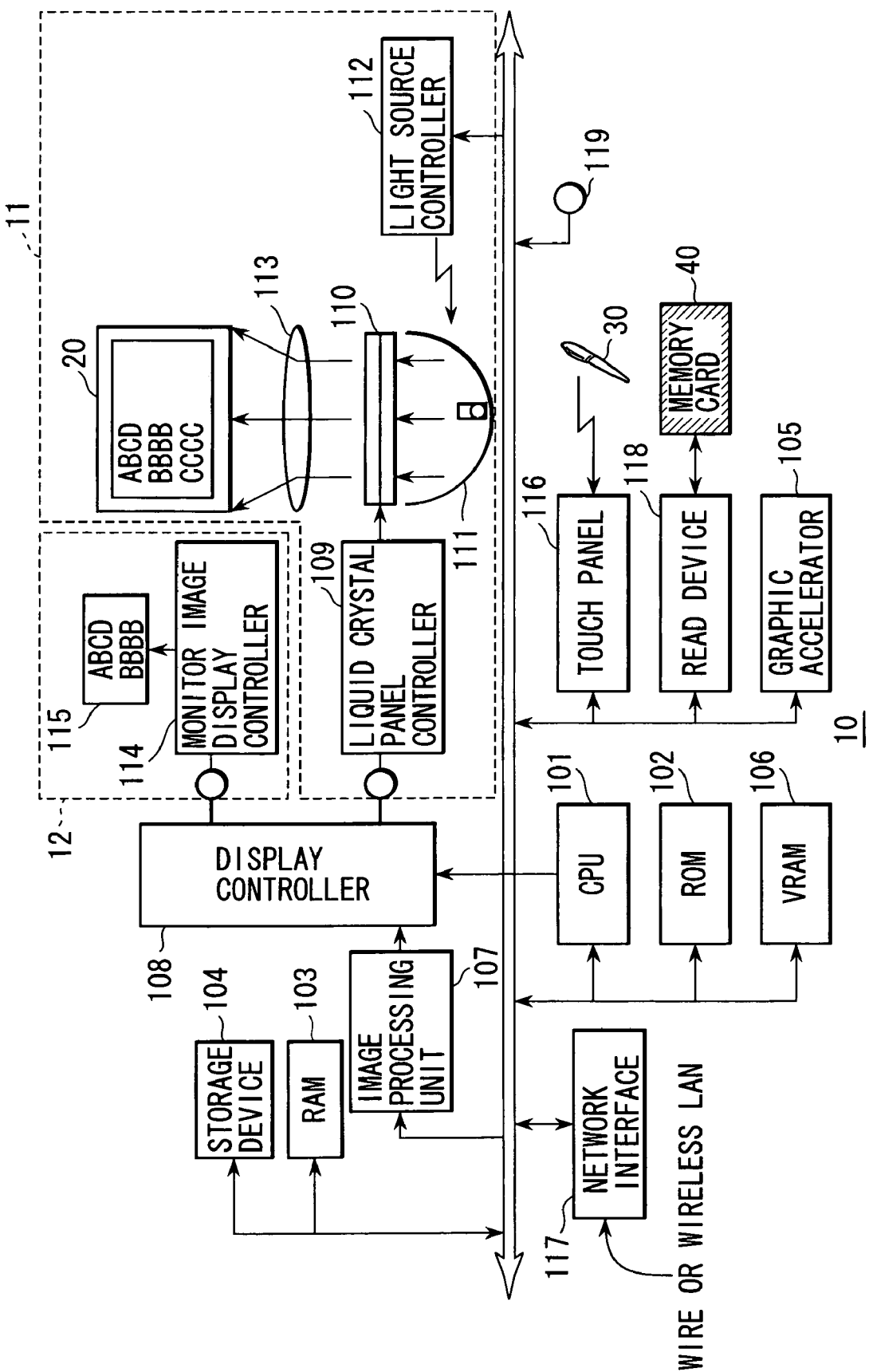
FIG. 1 is a block diagram of an image display device according to a first embodiment of the present invention.

As shown in FIG. 1, an image display device according to a first embodiment of the present invention is a projector into which the functions of a personal computer are incorporated. This image display device 10 is constructed from a CPU 101, a ROM 102, a RAM 103, a storage device 104, a graphic accelerator 105, a VRAM 106, an image processing unit 107, a display control unit 108, a liquid crystal panel control unit 109, a liquid crystal panel 110, a light source 111, a light source control unit 112, a projection lens 113, a monitor image display control unit 114, a monitor 115, a touch panel 116, a network interface unit 117, a read unit 118, and a switch 119.

The CPU 101 exercises control over each of the components in the image display device 10. The ROM 102 is a memory stored with an OS and applications software executed by the CPU 101. The RAM 103 is a memory used as the work area by the CPU 101. The storage unit 104 stores various files including image data files, the operating states of the applications software, etc.

In this specification, the application software refers to software designed for specific object, such as the creation of documents, mathematical calculations, etc. Typical examples of applications software include word-processing software, spreadsheet software, image editor software, database software, presentation software, game software, Web browser software, and electronic mail software. Accounting software, personnel management software and inventory control software, which are used by companies, are each a kind of application software. Moreover, such software as identifies the names and hierarchy of files and folders (directories) in a computer is also included in the applications software. An example of this type of software is Windows Explorer (registered trademark) developed by Microsoft Corp. Software that is not included in the applications software is operating system (OS) software, such as Windows (registered trademark), Linux (trademark), etc.

The graphic accelerator 105 expands image data to be displayed into a bit image. The VRAM 106 is a memory to store the expanded bit image. The image processing unit 107 reads the bit image out of the VRAM 106 and then sends it to the display control unit 108 together with necessary signals (a horizontal sync signal, vertical sync signal, clock signal, frame switching signal, etc.). The display control unit 108 sends these signals to the liquid crystal panel control unit 109 and the monitor image display control unit 114.

Figure 2:
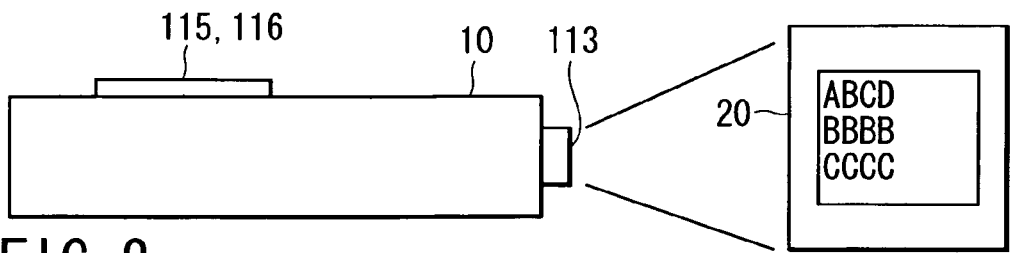
FIG. 2 shows the operating state of the image display device.

The liquid crystal panel control unit 109 controls the liquid crystal panel 110 in accordance with the bit image data. The light source 111 has its brightness controlled by the light source control unit 112. An image displayed on the liquid crystal panel 110 is projected through the projection lens 113 onto a screen 20 provided separately from the image display device 10 with light emitted from the light source 111 as shown in FIG. 2. The liquid crystal panel control unit 109, the liquid crystal panel 110, the light source 111, the light source control unit 112, the projection lens 113 and the screen 20 form a first display unit 11 which openly displays images to a number of viewers through projection.

The monitor image display control unit 114 displays an image corresponding to input bit image data on the monitor 115. The monitor image display control unit 114 and the monitor 115 form a second display unit 12 adapted to display an image so that an operator alone can see it.

Figure 3:
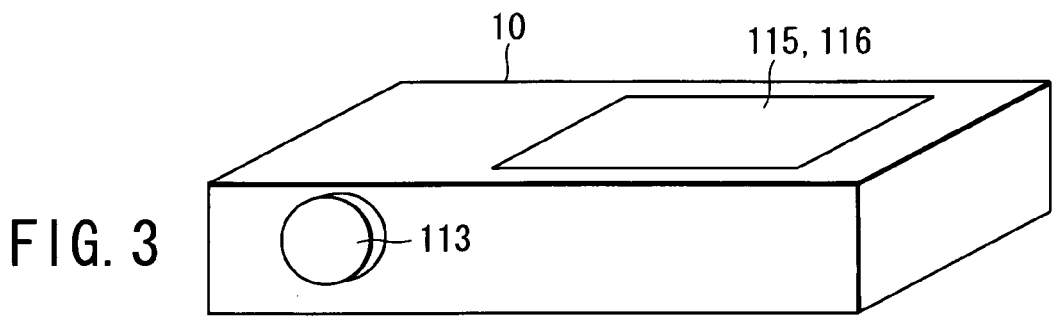
FIG. 3 is a perspective view of the image display device.

A touch panel 116 is mounted on the monitor 115 as shown in FIGS. 2 and 3. The touch panel 116 is adapted to, when touched with a pen 30, detect its position on the panel.

The network interface unit 117 receives various files, such as image data files, from external equipment over a wire or wireless LAN. The read device 118 reads various files, such as image data files, which are stored in a memory card 40 that is a portable storage medium. A file received by the network interface unit 117 or read by the read device 118 is stored in the storage device 104.

Figure 4:
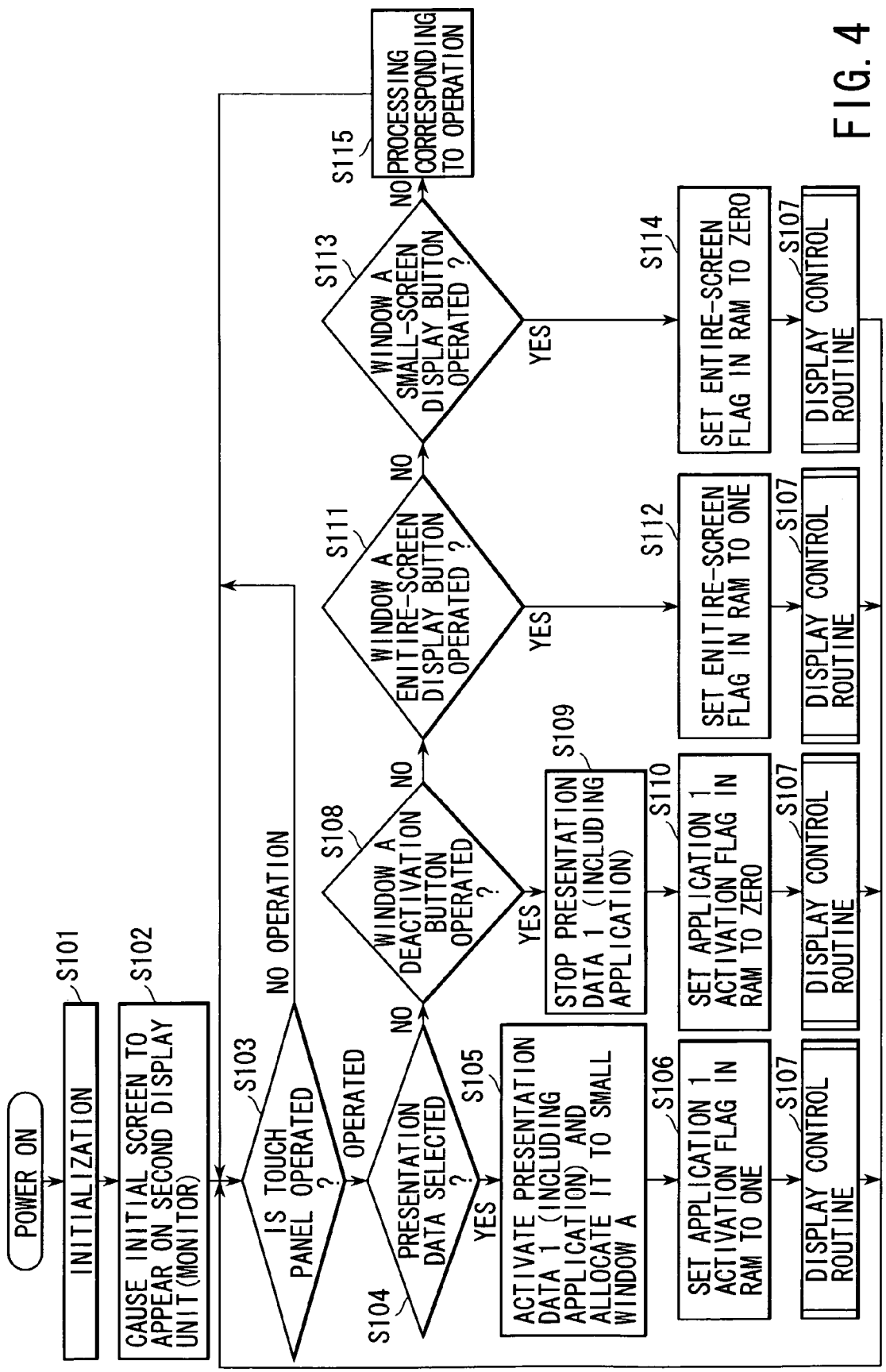
FIG. 4 is the main flowchart for processing carried out by the CPU of the image display device.

The operation of the image display device 10 thus configured will be described next with reference to FIG. 4 illustrating the main flowchart for processing carried out by the CPU 101.

Figure 5:
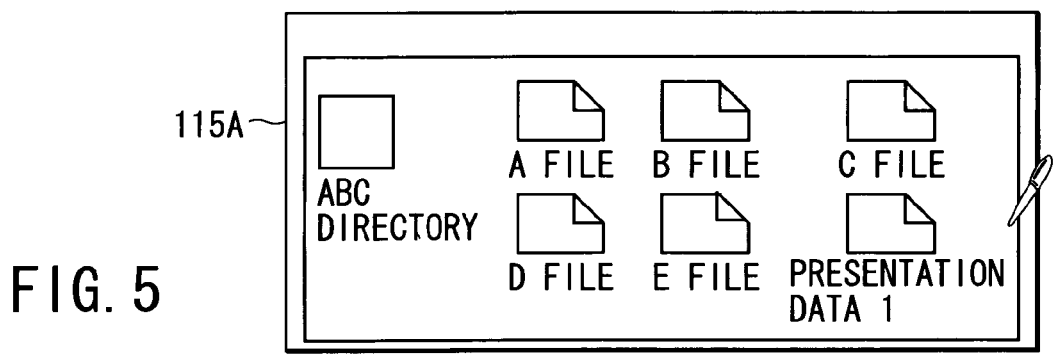
FIG. 5 shows an initial screen which appears on the monitor of the second display unit.

When the power switch (not shown) of the image display device 10 is turned on, the CPU 101 first carries out initialization on each part of the display device (step S101). After that, the CPU causes the initial screen to appear on a screen area 115A of the monitor 115 of the second display unit 12 as shown in FIG. 5 (step S102). The initial screen is one on which image select information, such as file icons and file names, is displayed so that the names and hierarchy of files and folders (directories) in the storage device 104 can be identified and specified. At this point, the first display unit 11 is placed in the non-display state. The CPU then enters the wait state until the touch panel 116 is operated (step S103).

When some operation is performed on the touch panel 116, the CPU 101 first makes a decision of whether or not that operation is to select a file of data to be visually displayed, or to be visually presented on the first display unit 11 (hereinafter referred to as presentation data) (step S104). If the decision is that a presentation data file select operation has been performed, then the CPU 101 activates the selected presentation data file (in this example, presentation data 1) and application software, which is stored in the ROM 102 and is needed to process the presentation data 1, and allocates the data file and application software to a window A in small-screen display state (step S105). After that, the application 1 activation flag (not shown) provided in the RAM 103 is set to one (step S106) and then a display control routine is called (step S107).

Figure 6:
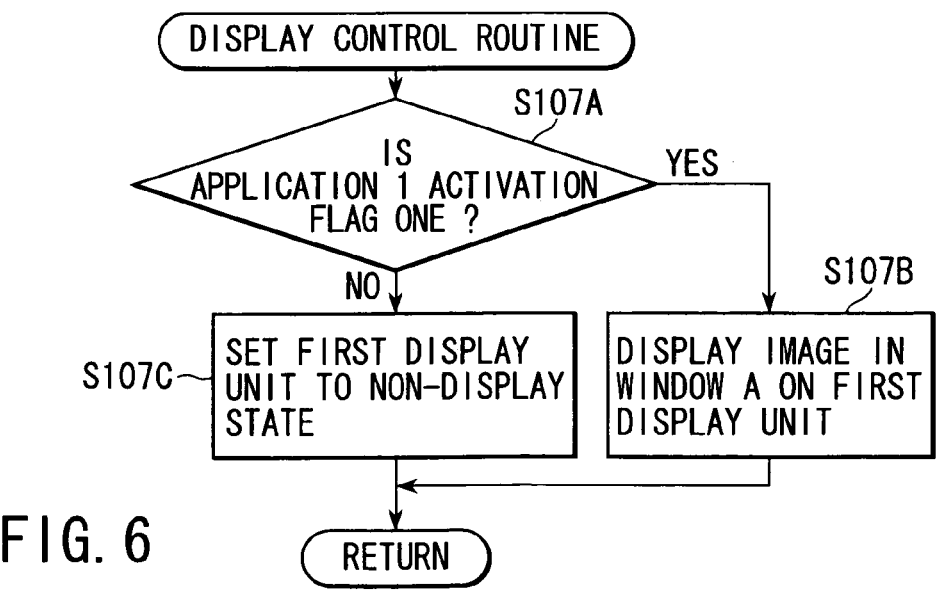
FIG. 6 is a flowchart for the display control routine.

In this display control routine, as shown in FIG. 6, a decision is first made as to whether or not the application 1 activation flag in the RAM 103 is one (step S107A). If the flag is one, then the allocated presentation data 1 is displayed in the specified window A of the first display unit 11 by the display control unit 108 (step S107B). After that, return is made to the main routine.

Figure 7:
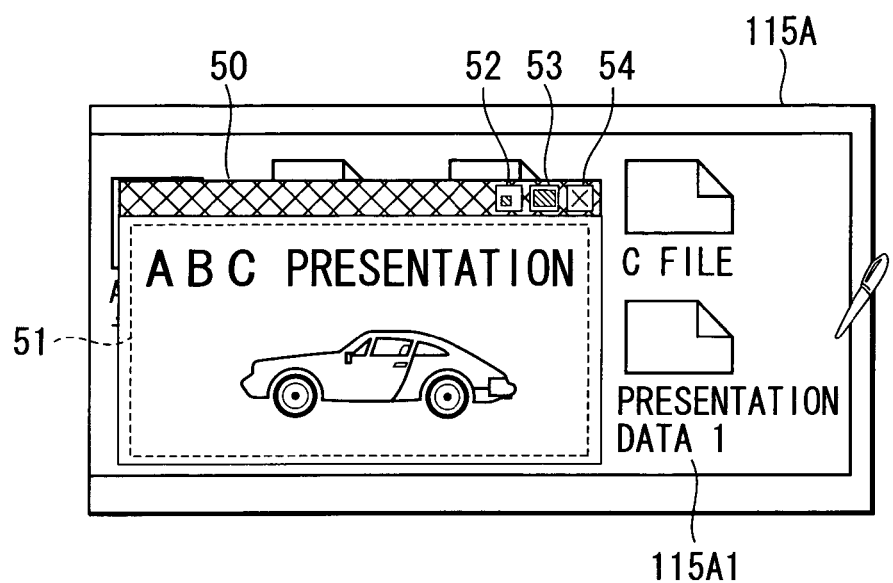
FIG. 7 shows the small-screen-based display state of a window A on the monitor of the second display unit.
Figure 8:
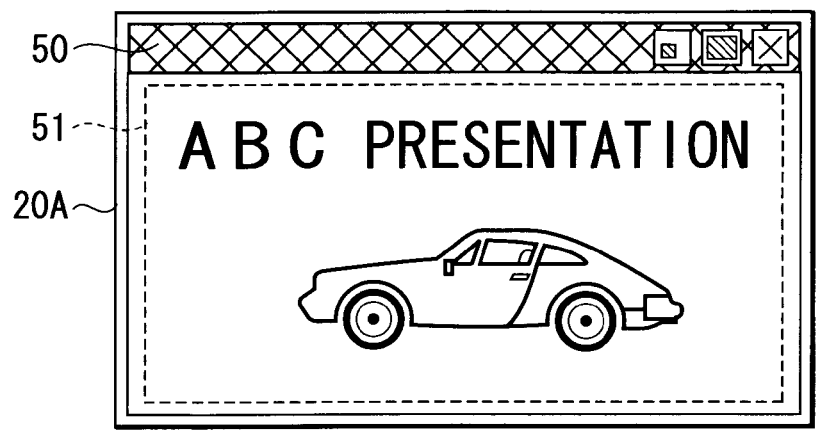
FIG. 8 shows the display state of the first display unit when the display of FIG. 7 is made.

Thereby, as shown in FIG. 7, with the initial screen containing the image select information, such as file icons and file names, as background image 115A1, the image 51 of the presentation data 1 is displayed in the window A 50 in the small-screen display state appearing in front of the background image on the screen area 115A of the monitor 115 of the second display unit 12. At this point, only the image 51 of the presentation data 1 which is to be displayed in the window A 50 is displayed on the entire projection screen area 20A of the screen 20 of the first display unit 11 as shown in FIG. 8. Thus, in this embodiment, an image is displayed on the entire screen of the first display unit 11 on starting application software regardless of an entire-screen display button.

If, on the other hand, the decision in step S104 is that the operation on the touch panel 118 is not to select a presentation data file, then a decision is made as to whether or not it is an operation of the button for deactivating the window A 50 (step S108). That is, the window A 50 contains a small-screen display button 52, an entire-screen display button 53, and a deactivation button 54 in addition to the screen 51 for the presentation data 1. In step S108, a decision is made as to whether the deactivation button 54 has been operated with the pen 30. If the decision is that the deactivation button 54 of the window A 50 has been operated, then the CPU 101 deactivates the selected presentation data 1 and its associated application software (step S109). After that, the CPU resets the application 1 flag in the RAM 103 to zero (step S110) and then calls such a display control routine as described above (step S107).

In this case, in the display control routine, the application 1 activation flag is decided to be zero in step S107A and the display control unit 108 sets the first display unit 11 to the non-display state (step S107C). Return is then made to the main routine. As a result, such an initial screen as shown in FIG. 5 will appear on the screen area 115A of the monitor 115 of the second display unit 12. On the other hand, the first display unit 11 is stopped from making projection display.

If the decision in step S108 is that the operation of the touch panel 116 is not an operation of the deactivation button 54 of the window A 50, a-decision is further made as to whether or not it is an operation of the entire-screen display button 53 (step S111). If the decision is that the entire-screen display button 53 of the window A 50 has been operated, then the CPU 101 sets the entire-screen flag (not shown) in the RAM 103 to one (step S112) and then calls such a display control routine as described above (step S107). In this case, since the application 1 activation flag has not been rewritten, no change will occur in the display state even if the display control routine is executed.

If the decision in step S111 is that the operation of the touch panel 116 is not an operation of the entire-screen display button 53, a decision is further made as to whether or not it is an operation of the small-screen display button 52 (step S113). If the decision is that the small-screen display button 52 of the window A 50 has been operated, then the CPU 101 resets the entire-screen flag (not shown) in the RAM 103 to zero (step S114) and then calls such a display control routine as described above (step S107). In this case as well, since the application 1 activation flag has not been rewritten, no change will occur in the display state even if the display control routine is executed.

If the decision in step S113 is that the operation of the touch panel 116 is not even an operation of the small-screen display button 52, then processing corresponding to that operation is carried out (step S115). This processing is not directly related to the invention and the description thereof is therefore omitted. Return is then made to the wait state in step S103 for an operation of the touch panel 116.

In this embodiment, since no change occurs in the display state even if the entire-screen display button 53 or the small-screen display button 52 of the window A 50 is operated, steps S111 through S114 may be omitted.

As described above, the image display device 10 according to the present embodiment is configured such that the CPU 101 detects the operating state of given application software and, based on the detected operating state of the application software, the CPU 101 and the display control unit 108 switch the first display unit 11 between display and non-display states. Accordingly, it becomes possible to provide security for data which must not be openly displayed to viewers other than the operator.

[Modification 1]

Figure 9:
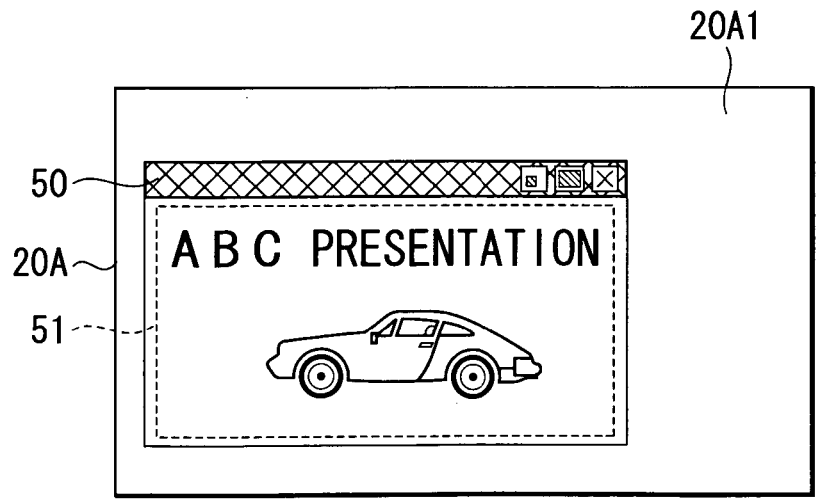
FIG. 9 shows the display state of the first display unit according to a first modification when the display of FIG. 7 is made.

A first modification of the first embodiment will be described. In the first embodiment, the first display unit 11 projection displays an image on the entire screen as shown in FIG. 8. However, the first display unit may projection-display an image on a small section of the screen as in the case of the second display unit 12 shown in FIG. 7. In this case, however, image select information, such as file icons and file names, is not to be displayed on the background 20A1 of the window A 50 as shown in FIG. 9.

[Modification 2]

Figure 10:
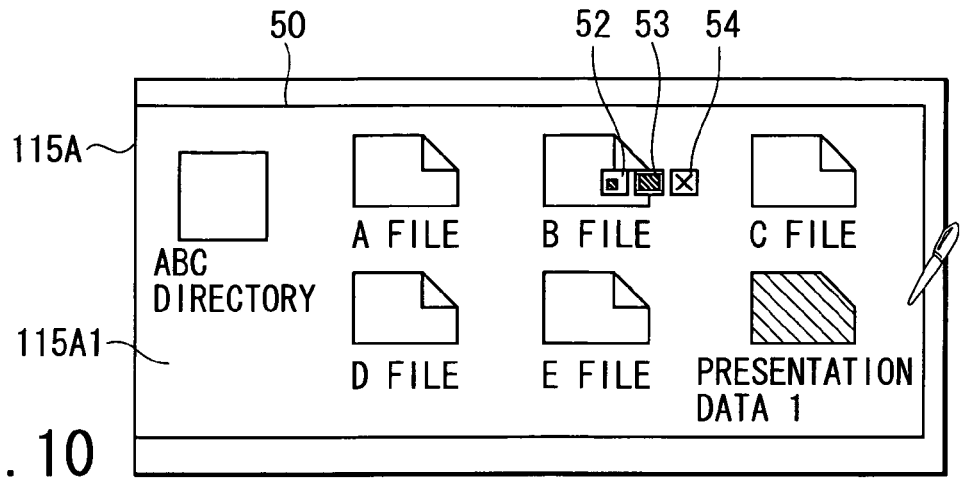
FIG. 10 shows a display screen of the second display unit according to a second modification when small-screen-based display of the window A is specified.

A second modification of the first embodiment will be described. In the first embodiment, the selected presentation data 1 is displayed on the window A 50 that is smaller than the screen of the second display unit 12 as shown in FIG. 7. The image 51 of the presentation data 1 is projection-displayed by the first display unit 11. The first embodiment may be modified in such a way as to display only the image select information, such as file icons and file names, on the second display unit 12 as shown in FIG. 10. In this case, a mark indicating being selected is displayed in a discernible manner. For example, the selected icon is displayed in a specific color. Moreover, the small-screen display button 52, the entire-screen display button 53 and the deactivation button 54 are floating displayed. The mark need not be limited to color. The shape may be changed or the arrangement on screen may be changed.

[Modification 3]

Figure 11:
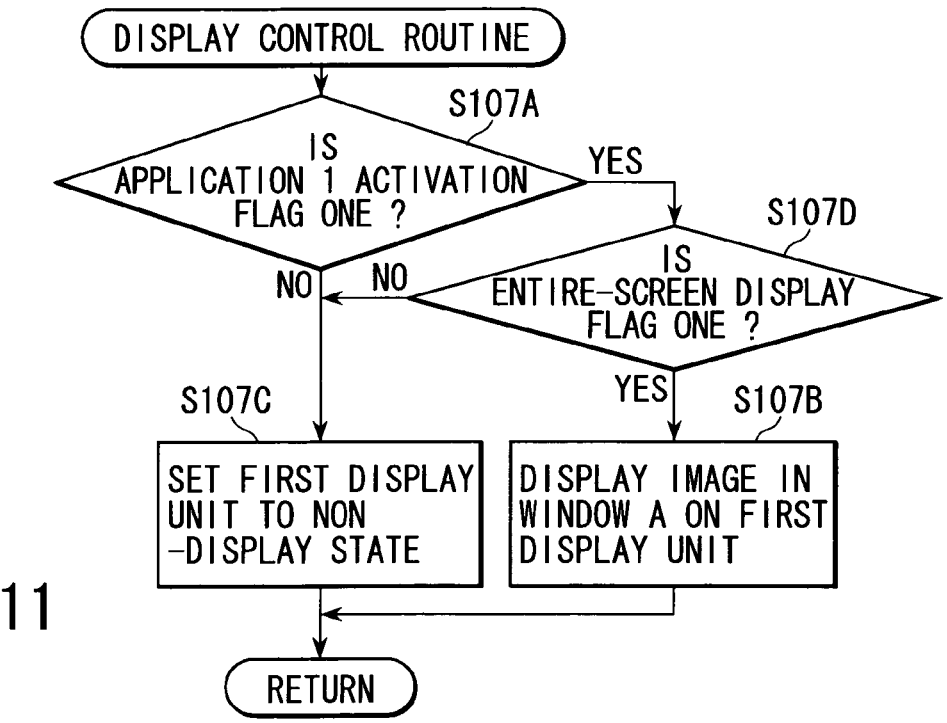
FIG. 11 is a flowchart for a display control routine according to a third modification.

A third modification of the first embodiment will be described. In the first embodiment, no change occurs in the display state even when the entire-screen display button 53 or the small-screen display button 52 of the window A 50 is operated. However, the display state may be changed according to an operation of either of these buttons by changing the display control routine in step S107 as shown in FIG. 11.

That is, first, a decision is made as to whether or not the application 1 activation flag in the RAM 103 is one (step S107A). If the decision is one, a decision is further made as to whether or not the entire-screen display flag in the RAM 103 is one (step S197D). This entire-screen display flag has been initialized to zero in step S101. The flag is set to one in step S112 and resets to zero in step S114.

When the display control routine is called after the decision that presentation data has been selected (step S104), the entire-screen display flag has been set to zero. In this case, therefore, the decision is NO in step S107D and the display control unit 108 then controls the first display unit 11 into the non-display state (step S107C). Return is then made to the main routine. Thereby, as shown in FIG. 7, with the initial screen containing the image select information, such as file icons and file names, as background image 115A1, the image 51 of the presentation data 1 is displayed in the small-screen display state window A 50 appearing in front of that background image on the screen area 115A of the monitor 115 of the second display unit 12. The fist display unit 11 is in the non-display state.

Figure 12:
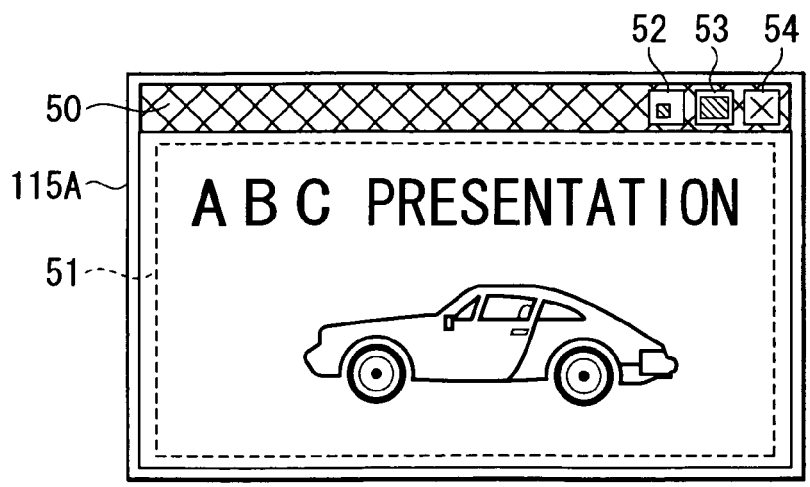
FIG. 12 shows the entire-screen-based display state of the window A on the monitor of the second display unit.

When the display control routine is called after the decision that the entire-screen display button for the window A 50 has been operated (step S111), the entire-screen display flag has been set to one in step S112. In this case, therefore, the decision is YES in step S107D and the display control unit 108 displays the allocated presentation data 1 in the specified window A 50 of the first display unit 11 (step S107B). Return is then made to the main routine. Thereby, as shown in FIG. 12, only the image 51 of presentation data 1 within the window A 50 is displayed on the entire screen area 115A of the monitor 115 of the second display unit 12. At this point, as shown in FIG. 8, only the image 51 of presentation data 1 within the window A 50 is displayed on the entire screen area 20A of the screen 20 of the first display unit 11 as well.

When the display control routine is called after the decision that the small-screen display button 52 has been operated (step S113), the entire-screen display flag has been set to zero in step S114. In this case, therefore, the decision is NO in step S107D and the display control unit 108 then controls the first display unit 11 into the non-display state (step S107C). Return is then made to the main routine. Thereby, as shown in FIG. 7, with the initial screen containing the image select information, such as file icons and file names, as background image 115A1, the image 51 of the presentation data 1 is displayed in the small-sized window A 50 appearing in front of that background image on the screen area 115A of the monitor 115 of the second display unit 12. In this case, however, the first display unit 11 does not make a small-screen display but is set to the non-display state.

Thus, the third modification is configured such that, only when two conditions of the activation of application software and the operation of the entire-screen display button 53 are met, a screenful of image is displayed on the first display unit 11 (and the second display unit 12).

Note that, when the two conditions are met, the first and second display units 11 and 12 may display an image in different manners, for example, in different resolutions. That is, the second display unit 12 is allowed to display the image on a small screen area.

The image display device may be provided with an operating switch as indicated at 119 in FIG. 1 in order to allow the first display unit 11 to provide selectively switched display as described in the present embodiment or continuous (normal) display.

Second Embodiment

Figure 16:
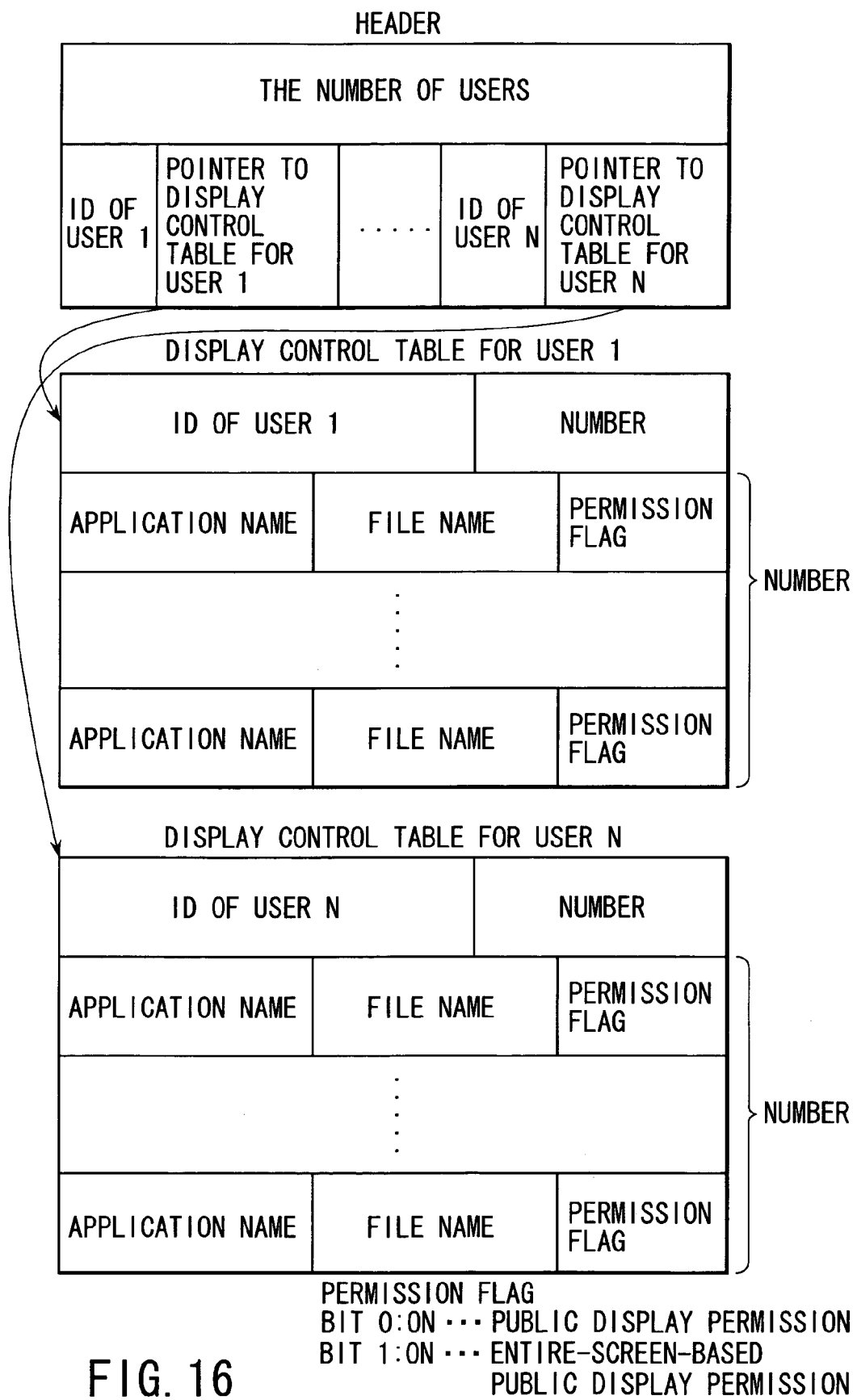
FIG. 16 shows integrated-type display unit setting table.

A second embodiment of the present invention will be described next. The second embodiment is configured in such a way as to retain display unit setting table in the nonvolatile storage device 104 and control the display switching of the first display unit 11 (and the second display unit 12) in accordance with the table contents. The display unit setting table can be set up as display control tables for each user, for each application software, and for each file as shown in FIGS. 13, 14 and 15. In addition, the setting items in those tables may be integrated into a table for each user as shown in FIG. 16. The second embodiment is described hereinafter in terms of the integrated type display unit setting table shown in FIG. 16.

That is, in the integrated type display unit setting table, a display control table is set up for each user. For this reason, the number of users, and the IDs of and the table area pointers for the respective users are set in the header. The display control table for each user comprises the ID of the user having authority for operation, the number, the name of application software to be display controlled, the file name including the location of the file, and permission flag. The permission flag is composed of two bits; the bit 0, when on, indicates public display permission and the bit 1, when on, indicates entire-screen-based public display permission. The number indicates the number of sets each of application name, file name and permission flag. The location refers to the location where a corresponding file exists in a hierarchical directory; for example, "c:\usr\tato\data1."

Figure 17:
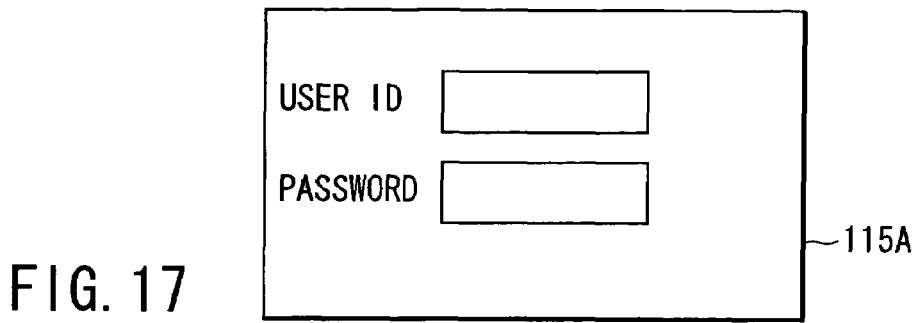
FIG. 17 shows a user ID and password entry screen.

The display unit setting table is updated automatically in the following manner. In the image display device 10 according to the second embodiment, after power on, the CPU 101 first makes such a display as shown in FIG. 17 on the monitor 115 of the second display unit 12. Only when the operator correctly enters the user ID and password through the touch panel 116 is the display device allowed to operate. In this case, a user ID in the display unit setting table is identified through the entered user ID.

Figure 18:
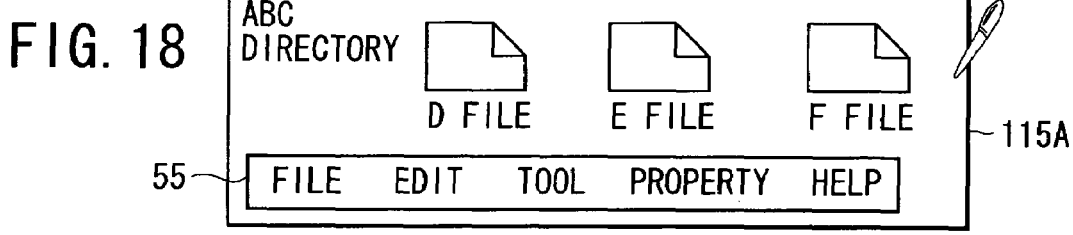
FIG. 18 shows a file select screen.

In the image display device 10 according to the second embodiment, when the correct password is entered, the CPU 101 causes an initialization screen to appear on the monitor 115 of the second display unit 12, thereby allowing the user to carry out initialization of contrast, brightness, etc. After that, the CPU causes such a file select screen as shown in FIG. 18 to appear on the monitor 115. By displaying the file select information containing file icons and names on the monitor 115, the operator is prompted to select a file containing an image to be shown to a number of viewers. That is, the operator can move between directories or specify a specific file on the file select screen. When a file is specified, application software which operates that file is identified. As described previously in connection with the first embodiment, files have been read from the memory card 40 or downloaded from a server or personal computer over a network into the storage device 104. It is also possible to directly specify a file on the memory card 40 or network-connected server or personal computer.

Figure 19:
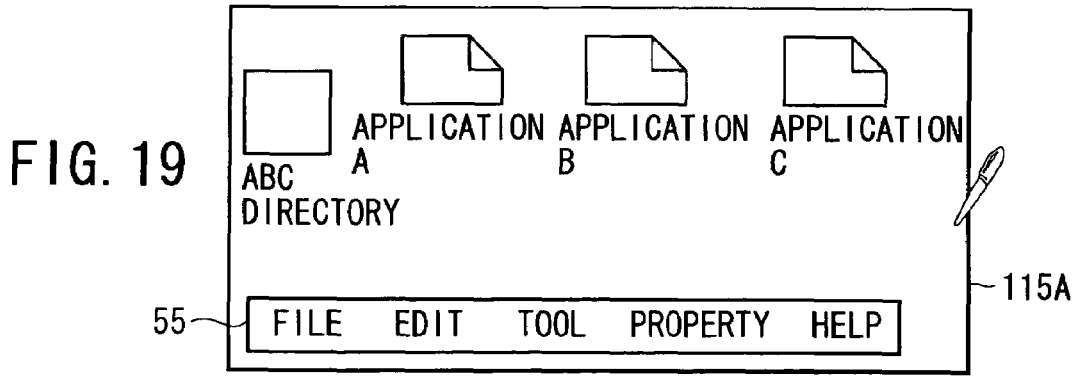
FIG. 19 shows an application select screen.
Figure 20:
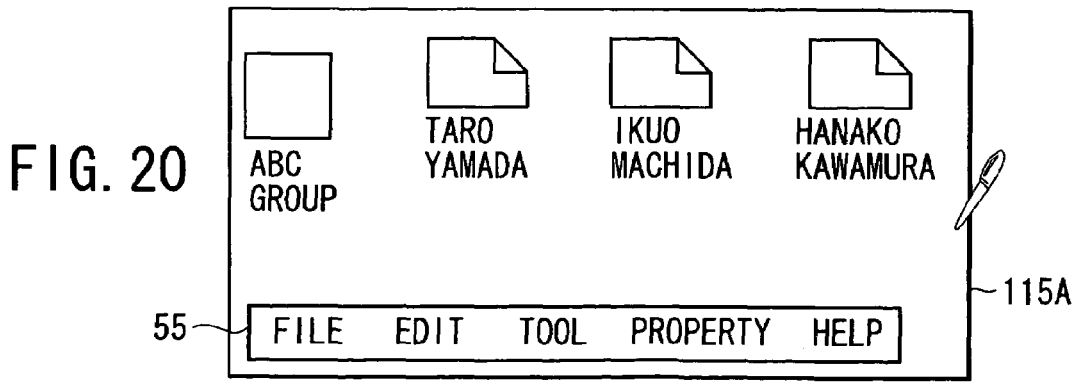
FIG. 20 shows an operator select screen.

When, in such a file select screen, for example, "Edit" is selected in a menu-bar 55 displayed along the bottom of the screen, a pop-up menu is displayed though not particularly shown, which allows a selection to be made from options, such as "Application", "Operator", etc. FIG. 19 shows a screen which appears on the monitor 115 of the second display unit 12 when "Application" is selected from the pop-up menu. FIG. 20 likewise shows a screen which appears on the monitor 115 of the second display unit 12 when "Operator" is selected. In each of these screens, selecting "Edit" allows another pop-up menu to be displayed and selecting each item in this menu allows another screen to appear.

After the user specifies a file, an application software, or an operator with a pen 30 in the select screens as shown in FIGS. 18, 19 or 20, specifying "Property" in the menu-bar 55 at the bottom of the screen allows the display unit setting table to be set up. For example, FIG. 21 shows a setting screen which appears on the monitor 115 of the second display unit 12 when a file is specified on the select screen of FIG. 18. Also, FIG. 22 shows a setting screen which appears on the monitor 115 of the second display unit 12 when a directory is specified. When a directory is specified, setting is applied to files contained in that directory. In either case, the user ID and the authority of the user (change, execution, write, read) are displayed. In addition, properties as to whether to permit public display and whether to permit entire-screen-based public display are displayed.

When necessary, the user makes decisions regarding public display permission and entire-screen-based public display permission and checks the permission and rejection columns. The CPU 101 allows the first display unit 11 to operate when, in the case where public display is selected, corresponding application software is activated or when, in the case where entire-screen-based public display is selected, corresponding applications software is activated and its window is placed in the entire-screen display state. For example, to initialize brightness, contrast, and so on not through the second display unit 12 but through the first display unit 11, the user marks the public display permission column of an initialization file with X. When wanting to present a file to a number of viewers, the user marks its entire-screen-based display permission column. As the result, as will be described in detail later, the CPU 101 performs display control on the basis of the display unit setting table, thereby allowing the first display unit 11 to provide public display only when the image display device is initialized and when the entire-screen-based presentation of a specified file is given. In other cases, only the monitor 115 of the second display unit 12 makes display for the operator alone. The user is relieved of troublesome operations by merely performing such straightforward settings. In addition, security is also ensured spontaneously.

Figure 23:
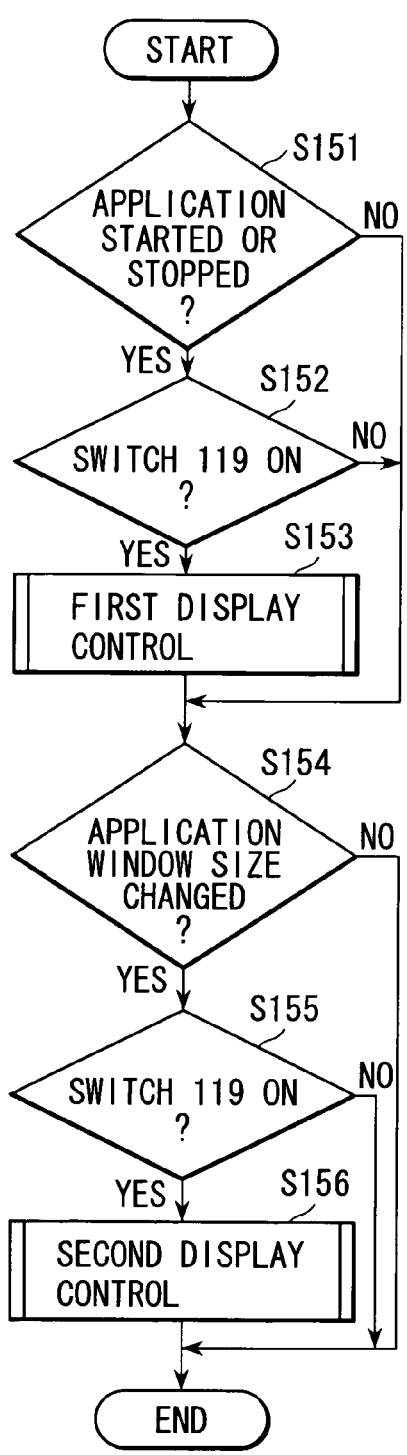
FIG. 23 is a flowchart for the display output switching processing in the second embodiment.

Next, reference is made to FIG. 23 to describe actual display output switching processing. This diagram illustrates only the display switching of the first display unit 11 which is characteristic of the present embodiment. In accordance with the main flowchart not shown, starting and stopping of actual application software and operations based on the application software are carried out by the CPU 101 and the display output switching processing is called when necessary. It goes without saying that the second display unit 12 provides display all the time.

First, a decision is made as to whether an operating state where application software is started or stopped has been reached (step S151). If the operating state has been reached, image display is considered as being permitted and the procedure goes to the following steps. That is, a decision is made as to whether or not the operating switch 119 is ON (step S152). If it is OFF, no display output switching processing is carried out. If, on the other hand, it is ON, the procedure goes to a first display control routine in which, as will be described in detail later using FIG. 24, comparison with the display unit setting table is made and, if conditions are met, the display output switching is performed (step S153).

Figure 25:
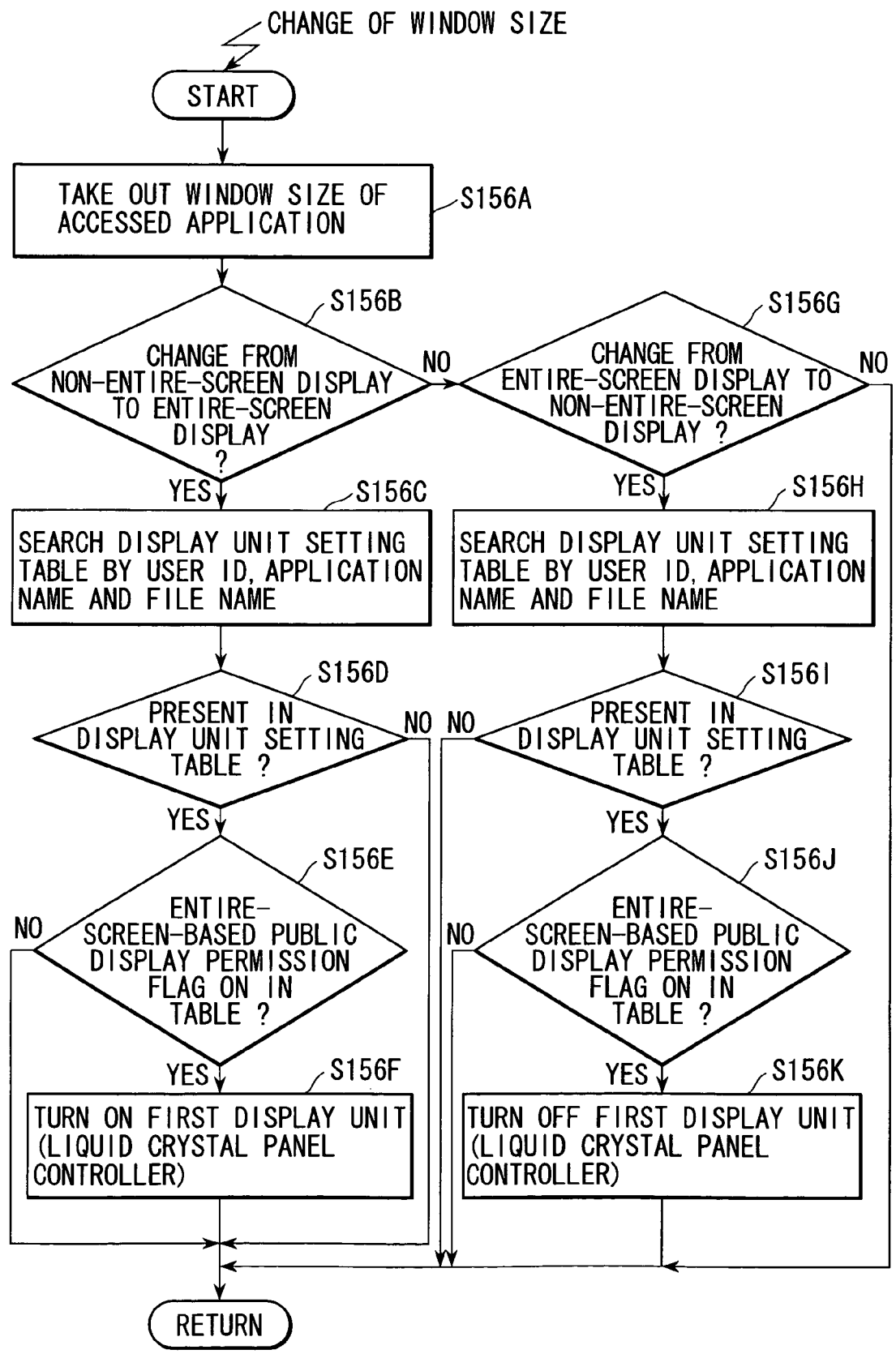
FIG. 25 is a flowchart for the second display control routine in FIG. 23.

After that, or if the decision is NO in step S151 or S152, a decision is made as to whether the window has been changed to the entire screen display state (step S154). In the case of change of the window size, since the image display may become permitted, the procedure goes to step S155 in which a decision is made as to whether the operating switching is ON or OFF. If it is OFF, no display output switching processing is carried out. If, on the other hand, it is ON, the procedure goes to a second display control routine in which, as will be described in detail later with reference to FIG. 25, comparison with the display unit setting table is made and, if conditions are met, the display output switching is performed (step S156).

Figure 24:
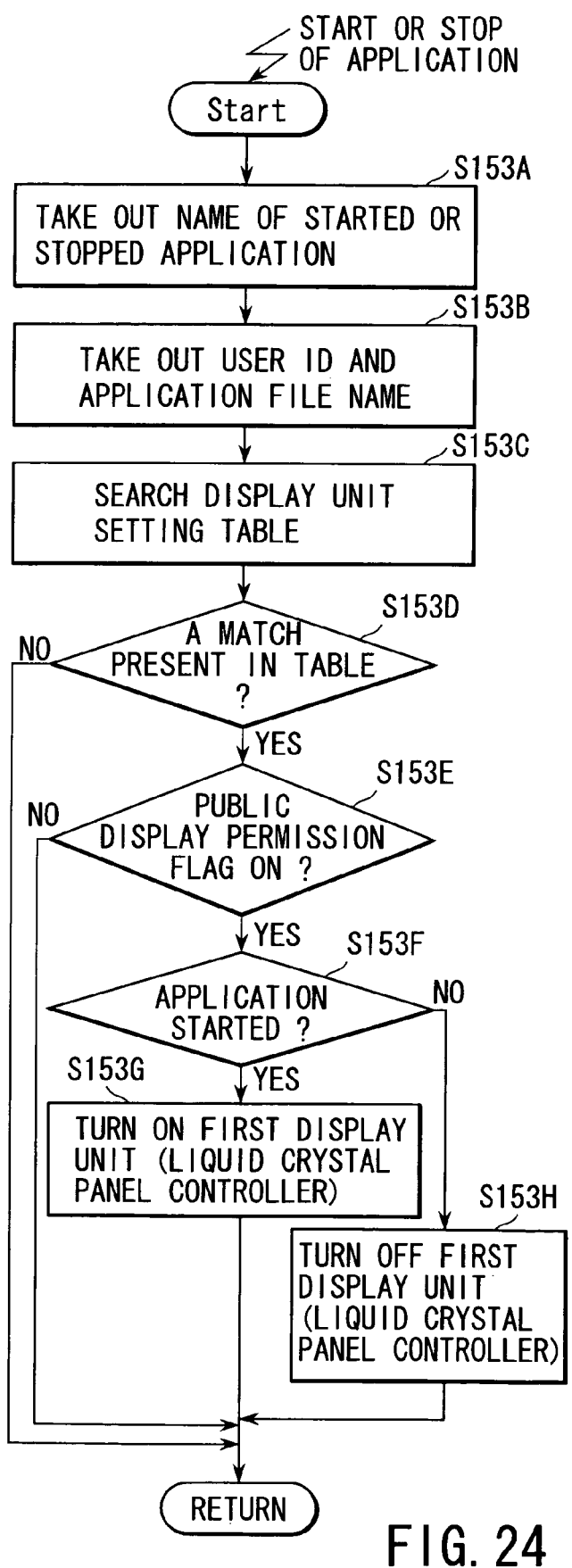
FIG. 24 is a flowchart for the first display control routine in FIG. 23.

FIG. 24 shows the first display control routine which is called in step S153. First, the name of an application which has its operating state changed is taken out of the RAM 103 managed by the OS (step S153A). Further, the user ID and the file name are taken out (step S153B). A search is then made for a table corresponding to such integrated type display unit setting table as shown in FIG. 16 (step S153C). This process is performed by finding the address of the display control table of a user whose ID matches that user ID in the display unit setting table header and then searching the display unit setting table for a match in application name and file name. If there is no match (step S153D), the processing comes to an end because the display output remains unchanged (not switched).

If, on the other hand, there is a match (YES in step S153D), the corresponding public display permission flag is verified (step S153E). If the flag is ON, a decision is made as to whether the first display control routine has been called by starting or stopping application software (step S153F). If it has been called by starting application software (YES in step S153F), the display control unit 108 applies the output of the image processing unit 107 to the first display unit 11 (the liquid crystal panel control unit 109) (step S153G). Thereby, projection display is made by the first display unit 11.

If, on the other hand, the first display control routine has been called by stopping application software (NO in step S153F), the display control unit 108 stops applying the output of the image processing unit 107 to the first display unit 11 (the liquid crystal panel control unit 109). Thereby, projection display by the first display unit 11 is stopped (step S153H).

If the public display permission flag is OFF in step S153E, nothing is performed. That is, the procedure comes to an end with the display output kept unchanged (not switched).

FIG. 25 shows the second display control routine which is called in step S153E. First, the window size of applications software having its window size changed is taken out (step S156A). This window size value is stored in the RAM 103 managed by the OS. A decision is next made as to whether the second display control routine has been called due to change from non-entire-screen display state to entire-screen display state (step S156B). If the routine has been called due to change to entire-screen display state, a decision is made as to whether the corresponding user ID, application name and file name of the opened file exist in the display unit setting table (step S156C). If they exist (YES in step S156D), a decision is made as to whether the entire-screen-based public display flag is ON (step S156E). If it is ON, the display control unit 108 applies the output of the image processing unit 107 to the first display unit 11 (liquid crystal panel control unit 109) (step S156F). Thereby, the window is projected on the entire screen by the first display unit 11.

If the decision in step S156D is that the corresponding user ID, application name and file name do not exist in the display unit setting table or the decision in step S156E is that the entire-screen-based public display flag is not ON, nothing is performed. That is, the procedure comes to an end with the display output kept unchanged (not switched).

If, on the other hand, the decision in step S156B is that the second display control routine has not been called due to change from non-entire-screen display state to entire-screen display state, a decision is made as to whether it has been called due to change from entire-screen display state to non-entire-screen display state (step S156G). If the decision is NO, the procedure comes to an end as it is. If the routine has been called due to change from entire-screen display state to non-entire-screen display state, a decision is made as to whether the corresponding user ID, application name and file name of the opened file exist in the display unit setting table (step S156H). If they exist (YES in step S156I), a decision is made as to whether the entire-screen-based public display flag is ON (step S156J). If it is ON, the display control unit 108 stops application of the output of the image processing unit 107 to the first display unit 11 (liquid crystal panel control unit 109), thereby stopping the projection display by the first display unit 11 (step S156K). In this case, it goes without saying that the window is displayed on a small-screen basis on the monitor 115 of the second display unit 12.

If the decision in step S156I is that the corresponding user ID, application name and file name do not exist in the display unit setting table or the decision in step S156J is that the entire-screen-based public display flag is not ON, nothing is performed. That is, the procedure comes to an end with the display kept unchanged (not switched).

As described above, the second embodiment is configured in such a way as to retain the display unit setting table in the nonvolatile storage device 104 and control the display switching of the first display unit 11 in accordance with the table contents. Accordingly, appropriately rewriting the contents of the display unit setting table allows display switching to be made as the operator desires.

Although the display unit setting table have been described as being stored in the storage device 104, they may be stored in the memory card 40. In such a case, the memory card can be carried together with image files and loaded into another image display unit, allowing display switching using the display unit setting table to be made on that display device.

The present invention is not limited to the disclosed embodiments but may be practiced or embodied in still other ways without departing from the scope and spirit thereof.

For example, although the second display unit 12 is provided integrally with the image display device 10, it may be constructed as an external display device which is connected to the device 10 by a cable or radio link.

Moreover, instead of switching the first display unit 11 OFF (non-display state), the first display unit may be kept ON to project a white image onto the entire screen 20.

Furthermore, although the image display device has been described in terms of a projector having the functions of personal computers built in, the projector may incorporate the functions of other computers than personal computers, such as servers, personal digital assistants (PDAs), etc. The computer refers to a device which is composed of an entry unit (a mouse, keyboard, touch panel, etc.), a control unit (CPU), a storage unit (a RAM, disk device, etc.), and an output unit (a display device, printer, etc.) and executes processing in accordance with the definitions of software.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image display device for displaying an image to viewers, comprising:
   an application state detecting unit configured to detect an operating state of predetermined application software;
   a first display unit configured to display the image; and
   a control unit configured to control whether to operate the first display unit or not in accordance with the operating state detected by the application state detecting unit;
   wherein the operating state which the application state detecting unit detects includes a starting state of the application software, and
   when the start of the application software is detected by the application state detecting unit, the control unit sets the first display unit to a state where it is permitted to display an image associated with the application software.

2. The device according to claim 1, wherein the control unit causes the first display unit to display only the image associated with the application software set to the permitted state.

3. The device according to claim 1, further comprising a switch configured to turn ON/OFF the first display unit, wherein
   when turned ON by the switch, the first display unit displays only an image which has been set to the permitted state by the control unit.

4. The device according to claim 2, further comprising a state setting unit configured to set an operating state that the application state detecting unit detects for each application software.

5. The device according to claim 4, further comprising a state storing unit configured to store the operating state of each application software set by the state setting unit.

6. The device according to claim 5, wherein the state storing unit includes a portable storage medium.

7. The device according to claim 2, further comprising a state setting unit configured to set an operating state that the application state detecting unit detects for at least one of each image data and each directory storing the image data.

8. The device according to claim 7, further comprising a state storing unit configured to store the operating state of each application software set by the state setting unit.

9. The device according to claim 8, wherein the state storing unit includes a portable storage medium.

10. The device according to claim 2, further comprising a state setting unit configured to set an operating state that the application state detecting unit detects for each operator.

11. The device according to claim 10, further comprising a state storing unit configured to store the operating state of each application software set by the state setting unit.

12. The device according to claim 11, wherein the state storing unit includes a portable storage medium.

13. An image display device for displaying an image to viewers, comprising:
an application state detecting unit configured to detect an operating state of predetermined application software;
a first display unit configured to display the image; and
a control unit configured to control whether to operate the first display unit or not in accordance with the operating state detected by the application state detecting unit;
wherein the operating state which the application state detecting unit detects includes a stopping operation state of the application software, and
when the stopping operation of the application software is detected by the application state detecting unit, the control unit sets the first display unit to a state where it is not permitted to display an image associated with the application software.

14. The device according to claim 13, further comprising a second display unit configured to display an image to an operator of the image display device, wherein
the control unit caused at least the second display unit to display an image associated with application software set to the non-permitted state.

15. An image display device for displaying an image to viewers, comprising:
an application state detecting unit configured to detect an operating state of predetermined application software;
a first display unit configured to display the image; and
a control unit configured to control whether to operate the first display unit or not in accordance with the operating state detected by the application state detecting unit;
wherein the operating state which the application state detecting unit detects includes an entire-screen display state of a window associated with the application software, and
when the entire-screen display state of the window associated with the application software is detected by the application state detecting unit, the control unit sets the first display unit to a state where it is permitted to display an image associated with the started application software on an entire-screen display basis.

16. The device according to claim 15, wherein the control unit causes the first display unit to display only the image associated with the application software set to the permitted state.

17. The device according to claim 15, further comprising a switch configured to turn ON/OFF the first display unit, wherein
when turned ON by the switch, the first display unit displays only an image which has been set to the permitted state by the control unit.

18. A program which controls image data to be output to an external display device connected to a computer, the program causing the computer to perform the following functions:
an application state detecting function of detecting an operating state of application software running on the computer; and
a display control function of controlling the image data to be output to the external display device according to the operating state detected by the application state detecting function;
wherein the operating state which the application state detecting function detects includes a starting state of the application software, and
wherein the display control function includes a function of output image data to the external display device when the start of the application software is detected by the application state detecting function.

19. A program which controls image data to be output to an external display device connected to a computer, the program causing the computer to perform the following functions:
an application state detecting function of detecting an operating state of application software running on the computer; and
a display control function of controlling the image data to be output to the external display device according to the operating state detected by the application state detecting function;
wherein the operating state which the application state detecting function detects includes a stopping operation state of the application software, and
wherein the display control function includes a function of stop the output of image data to the external display device when the stopping operation of the application software is detected by the application state detecting function.

20. A program which controls image data to be output to an external display device connected to a computer, the program causing the computer to perform the following functions:
an application state detecting function of detecting an operating state of application software running on the computer; and
a display control function of controlling the image data to be output to the external display device according to the operating state detected by the application state detecting function;
wherein the operating state which the application state detecting function detects includes an entire-screen display state of a window associated with the application software, and
wherein the display control function includes a function of output image data to the external display device when the entire-screen display state of the window associated with the application software is detected by the application state detecting function.

21. A method which controls image data to be output to an external display device connected to a computer, comprising:
detecting an operating state of application software running on the computer;
controlling the image data to be output to the external display device according to the detected operating state;
wherein detecting the operating state includes detecting a starting state of the application software, and
when the starting state of the application software is detected, setting the external display device to a state where it is permitted to display an image associated with the application software.

22. An image display device for displaying an image to viewers, comprising:
application state detecting means for detecting an operating state of predetermined application software;
first display means for displaying the image; and
control means for controlling whether to operate the first display means or not in accordance with the operating state detected by the application state detecting means;

wherein the operating state which the application state detecting means detects includes a starting state of the application software, and when the start of the application software is detected by the application state detecting means, the control means sets the first display means to a state where it is permitted to display an image associated with the application software.

* * * * *